United States Patent
Lange et al.

(10) Patent No.: US 9,816,369 B2
(45) Date of Patent: Nov. 14, 2017

(54) BEND MEASUREMENTS OF ADJUSTABLE MOTOR ASSEMBLIES USING STRAIN GAUGES

(71) Applicant: HALLIBURTON ENERGY SERVICES, INC., Houston, TX (US)

(72) Inventors: Gustav Edward Lange, Millet (CA); Kennedy John Kirkhope, Leduc (CA)

(73) Assignee: Halliburton Energy Services, Inc., Houston, TX (US)

( * ) Notice: Subject to any disclaimer, the term of this patent is extended or adjusted under 35 U.S.C. 154(b) by 333 days.

(21) Appl. No.: 14/430,068

(22) PCT Filed: Dec. 31, 2013

(86) PCT No.: PCT/US2013/078421
§ 371 (c)(1),
(2) Date: Mar. 20, 2015

(87) PCT Pub. No.: WO2015/102600
PCT Pub. Date: Jul. 9, 2015

(65) Prior Publication Data
US 2016/0040525 A1 Feb. 11, 2016

(51) Int. Cl.
*E21B 4/16* (2006.01)
*E21B 44/00* (2006.01)
(Continued)

(52) U.S. Cl.
CPC .............. *E21B 47/024* (2013.01); *E21B 4/00* (2013.01); *E21B 4/16* (2013.01); *E21B 7/04* (2013.01);
(Continued)

(58) Field of Classification Search
CPC ........ E21B 7/068; E21B 44/005; E21B 47/02; E21B 47/024; E21B 4/00; E21B 4/16; E21B 7/067; G01B 21/32; G05B 15/02
See application file for complete search history.

(56) References Cited

U.S. PATENT DOCUMENTS 2,943,397 A   7/1960  Ring
4,303,994 A  12/1981  Tanguy
(Continued)

FOREIGN PATENT DOCUMENTS

WO   0129371   4/2001

OTHER PUBLICATIONS

International Patent Application No. PCT/US2013/078421, International Search Report and Written Opinion, dated Sep. 22, 2014, 16 pages.

*Primary Examiner* — Daniel P Stephenson
(74) *Attorney, Agent, or Firm* — Kilpatrick Townsend & Stockton LLP (57) ABSTRACT

A wellbore assembly is provided that can include a first motor housing assembly member and a second motor housing assembly member that can bend relative to the first motor housing assembly at a bend location. The assembly can also include a strain gauge positioned on a first side of the bend location to determine an amount of bend of the second motor housing assembly member relative to the first motor housing assembly member by determining a strain. Based on the strain, the amount of bend or bend direction of the second motor housing assembly member relative to the first motor housing assembly member can be determined.

28 Claims, 7 Drawing Sheets

(51) Int. Cl.
  *E21B 47/024* (2006.01)
  *E21B 7/06* (2006.01)
  *G01B 21/32* (2006.01)
  *G05B 15/02* (2006.01)
  *E21B 47/02* (2006.01)
  *E21B 7/04* (2006.01)
  *E21B 4/00* (2006.01)

(52) U.S. Cl.
  CPC .............. *E21B 7/067* (2013.01); *E21B 7/068* (2013.01); *E21B 44/005* (2013.01); *E21B 47/02* (2013.01); *G01B 21/32* (2013.01); *G05B 15/02* (2013.01)

(56) References Cited

U.S. PATENT DOCUMENTS

| | | |
|---|---|---|
| 4,324,297 A | 4/1982 | Denison |
| 4,407,374 A | 10/1983 | Wallussek et al. |
| 4,445,578 A | 5/1984 | Millheim |
| 4,880,066 A | 11/1989 | Steiginga et al. |
| 4,894,923 A | 1/1990 | Cobern et al. |
| 5,117,927 A | 6/1992 | Askew |
| 5,194,859 A | 3/1993 | Warren |
| 5,394,951 A | 3/1995 | Pringle et al. |
| 5,602,541 A * | 2/1997 | Comeau ............... E21B 7/04 175/45 |
| 5,646,611 A | 7/1997 | Dailey et al. |
| 6,068,394 A | 5/2000 | Dublin |
| 6,192,748 B1 | 2/2001 | Miller |
| 6,273,189 B1 * | 8/2001 | Gissler ............... E21B 4/04 166/241.1 |
| 6,405,808 B1 | 6/2002 | Edwards et al. |
| 6,585,061 B2 | 7/2003 | Radzinski et al. |
| 6,877,241 B2 | 4/2005 | Barr et al. |
| 7,114,565 B2 | 10/2006 | Estes et al. |
| 7,503,403 B2 | 3/2009 | Jogi et al. |
| 7,506,696 B2 | 3/2009 | Weston et al. |
| 7,556,105 B2 | 7/2009 | Krueger |
| 7,725,263 B2 | 5/2010 | Sugiura |
| 7,870,912 B2 | 1/2011 | Dolgin et al. |
| 7,882,904 B2 | 2/2011 | von Gynz-Rekowski et al. |
| 8,302,705 B2 | 11/2012 | Downton |
| 8,360,172 B2 | 1/2013 | Santelmann |
| 8,428,879 B2 | 4/2013 | Ekseth et al. |
| 8,434,567 B2 | 5/2013 | Menezes et al. |
| 2003/0094310 A1 | 5/2003 | Eppink et al. |
| 2005/0109097 A1 | 5/2005 | Bogath et al. |
| 2005/0161258 A1 | 7/2005 | Lockerd et al. |
| 2006/0045408 A1 | 3/2006 | Jones et al. |
| 2006/0157278 A1 | 7/2006 | Dolgin et al. |
| 2007/0175639 A1 | 8/2007 | Hoen |
| 2008/0035376 A1 | 2/2008 | Freyer |
| 2009/0260823 A1 * | 10/2009 | Prince-Wright ....... C10G 21/22 166/302 |
| 2011/0162891 A1 * | 7/2011 | Camp ................ E21B 7/067 175/61 |
| 2011/0284292 A1 | 11/2011 | Gibb et al. |
| 2012/0013339 A1 | 1/2012 | Kuckes |
| 2012/0143521 A1 | 6/2012 | Chen et al. |
| 2012/0205154 A1 | 8/2012 | Lozinsky et al. |
| 2013/0292176 A1 | 11/2013 | Ekseth et al. |
| 2014/0196953 A1 * | 7/2014 | Chitwood ........... E21B 33/1243 175/57 |
| 2016/0040525 A1 * | 2/2016 | Lange .................. E21B 4/16 175/40 |

* cited by examiner

BEND MEASUREMENTS OF ADJUSTABLE MOTOR ASSEMBLIES USING STRAIN GAUGES

CROSS-REFERENCE TO RELATED APPLICATIONS

This is a U.S. national phase under 35 U.S.C. §371 of International Patent Application No. PCT/US2013/078421, titled "Bend Measurements Adjustable Motor Assemblies Using Strain Gauges" and filed Dec. 31, 2013, the entirety of which is hereby incorporated by reference herein.

TECHNICAL FIELD

The present disclosure relates generally to devices for use in well systems. More specifically, but not by way of limitation, this disclosure relates to measuring a bend of an adjustable motor assembly using one or more strain gauges.

BACKGROUND

A well system (e.g., oil or gas wells for extracting fluids from a subterranean formation) can include a drill string for forming a wellbore. A drill string can include a bottom hole assembly with a drill bit, stabilizers, a downhole motor, or other components.

A drill string can be used to drill a directional (or deviated) wellbore that is not vertical in its entirety. Directional wellbores can enhance production of the wellbores. To obtain an angle of inclination to drill directional wells, downhole drilling motors can include adjustable housing assemblies. An adjustable housing assembly can allow the drill operator to change the inclination of a housing assembly without replacing the entire bent housing section. An amount of bend downhole of an adjustable housing assembly can be challenging to obtain.

DETAILED DESCRIPTION

Certain aspects and features of the present disclosure are directed to determining bend measurements of adjustable motor assemblies or other downhole assemblies using strain gauges. The adjustable motor assembly can include a first motor housing assembly member. The adjustable motor assembly can further include a second motor housing assembly member. The second motor housing assembly member can be coupled to the first motor housing assembly member so that the first motor housing assembly member can bend relative to the second motor housing assembly member at a bend location in a wellbore. The adjustable motor assembly can also include a strain gauge. In one embodiment, the strain gauge can be positioned on the first motor housing assembly member to determine a strain. In another embodiment, the strain gauge can be positioned on the second motor housing assembly member to determine the strain.

In some embodiments, the adjustable motor assembly can further include a third motor assembly member located inside the first or second motor housing assembly members. The third motor assembly member can be a mandrel. In one such embodiment, a strain gauge can be positioned on the third motor assembly member on a first side of a bend location to determine a strain. In some embodiments, the third motor assembly member can rotate around a rotation axis.

The strain detected by the strain gauge can change as the first motor housing assembly member bends relative to the second motor housing assembly member. The changed strain measurement can be used to determine the amount of bend or bend direction of the first motor housing assembly member relative to the second motor housing assembly member.

In one example, an adjustable motor assembly can be a part of a bottom hole drilling assembly deployed in a wellbore. The first and second motor housing assembly members can be drill motor housing assembly members of the adjustable motor assembly. A drill operator can cause the adjustable motor assembly to bend at a bend location in the wellbore such that a first motor housing assembly member bends relative to a second motor housing assembly member at the bend location. As the first housing member bends relative to the second housing member, the strain on the strain gauge can change. The measurement from the strain gauge can be used to determine the amount of bend and, in some embodiments, the bend direction of the first motor housing member relative to the second motor housing member. Assemblies according to some embodiments can allow the drill operator to confirm that the adjustable motor assembly is functioning properly or predict how the bottom hole assembly will perform in a formation.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
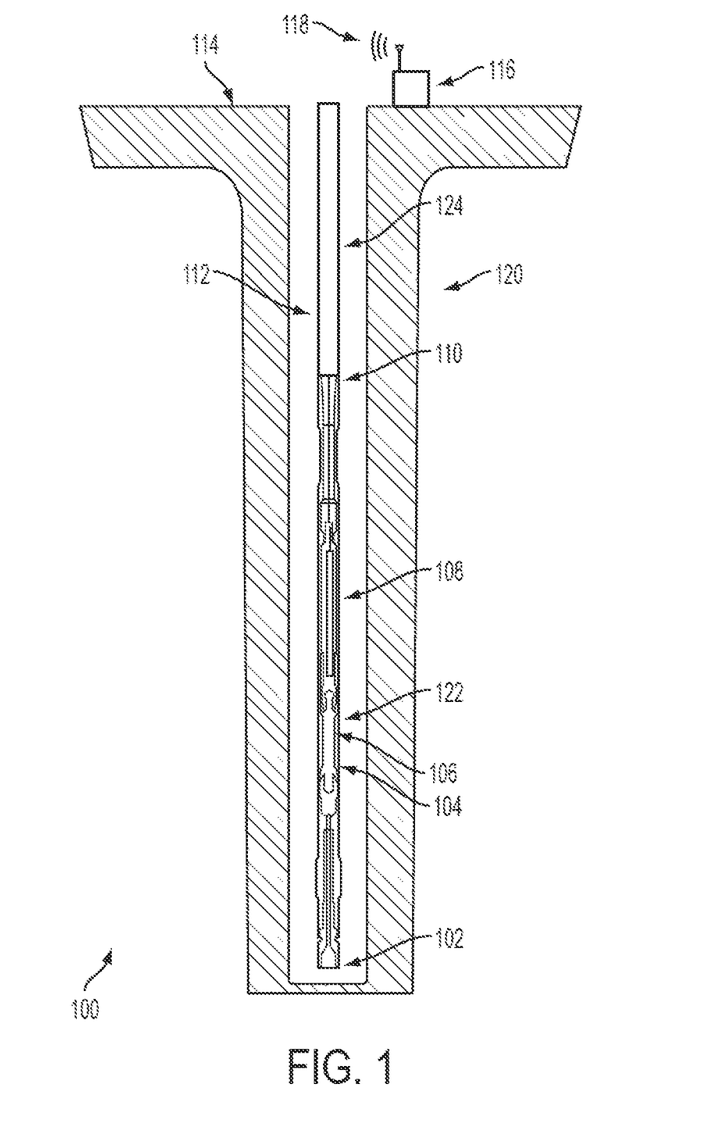
FIG. 1 is a cross-sectional side view of one embodiment of a system that can include an adjustable motor assembly for which bend measurements can be determined using strain gauges according to one aspect of the present disclosure.

FIG. 1 is a cross-sectional side view of one embodiment of a system 100 that can include an adjustable motor assembly 122 for which bend measurements can be determined using strain gauges. In this example, the system 100 is a well system (e.g., an oil or gas well for extracting fluids from a subterranean formation). The system 100 can include a wellbore 112 drilled out of a formation 120 from a surface 114. A drill string 124, which can contain a bottom hole assembly, for drilling can be located in the wellbore 112. The bottom hole assembly can include an upper connection 110, a power section 108, and a drill bit 102. The power section 108 can include a motor assembly 122 with an adjustable housing 104 that can bend at a bend location 106.

The system 100 can also include a computing device 116 for receiving a strain gauge measurement, a bend measurement, or a direction measurement. The computing device 116 can be positioned at the wellbore surface 114, below ground, or offsite. The computing device 116 can include a processor interfaced with other hardware via a bus. A memory, which can include any suitable tangible (and non-transitory) computer-readable medium such as RAM, ROM, EEPROM, or the like, can embody program components that configure operation of the computing device 116. In this example, the computing device 116 can further include input/output interface components and additional storage.

The computing device 116 can receive a strain gauge measurement, a bend measurement, or a direction measurement via a communication device 118. The communication device 118 can represent one or more of any components that facilitate a network connection. In this example, the communication device 118 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other embodiments, the communication device 118 can be wired and can include interfaces such as Ethernet, USB, or IEEE 1394.

In some embodiments, the computing device 116 can receive the strain measurement, an amount of bend, or a bend direction via the communication device 118, or determine the amount of bend or bend direction, and compare it with a designated drilling trajectory. Should the amount of bend and bend direction need to be altered to conform with the designated drilling trajectory, the computing device 116 can cause the amount of bend or bend direction of the second motor housing assembly member relative to the first motor housing assembly member to change.

Figure 2A:
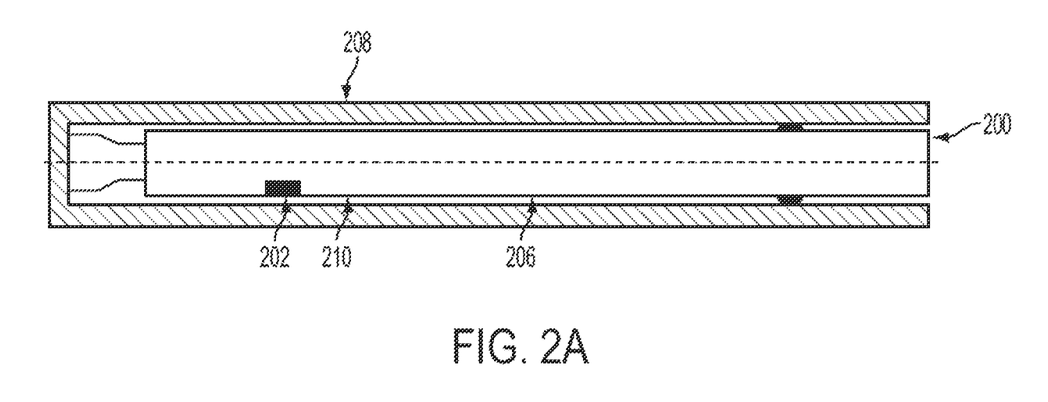
FIG. 2A is a cross-sectional side view of an embodiment of an assembly for determining bend measurements of an adjustable motor assembly using strain gauges in which there is no bend in the adjustable motor assembly according to one aspect of the present disclosure.

FIG. 2A is a cross-sectional side view of another embodiment of an assembly for determining bend measurements of an adjustable motor assembly 200 using strain gauges 202 in which there is no bend in the adjustable motor assembly according to one aspect of the present disclosure. The adjustable motor assembly 200 can include a bendable housing 206. A strain gauge 202 can be positioned on a first side of a bend location 210. In one such embodiment, the strain gauge 202 can be positioned on the outside of the bendable housing 206. In another such embodiment, the strain gauge 202 can be positioned on the inside of the bendable housing 206. In another embodiment, a multitude of strain gauges 202 can be positioned around the circumference of the bendable housing 206.

The strain gauge 202 according to some embodiments can include a constantan alloy, a Karma alloy, a semiconductor, a piezoresistor, a foil gauge, mercury, a fiber optic sensor, a capacitor, a dial indicator, or any other conductor or device for determining strain. In some such embodiments, temperature can affect strain gauge measurements. In such an embodiment, the strain gauge 202 can include hardware or software that compensates for the temperature effects on strain gauge 202 measurements. Further, the strain gauge 202 may include a one or more of a processor, a transducer, a microcontroller, memory, a bus, or a filter. In some such embodiments, the filter can remove background vibrations or other noise from the strain measurement.

Figure 2B:
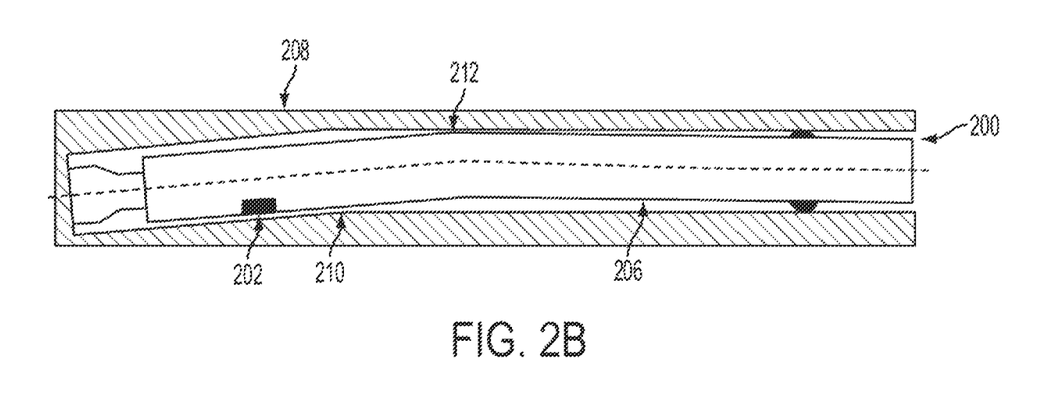
FIG. 2B is a cross-sectional side view of the embodiment in FIG. 2A in which there is a bend in the adjustable motor assembly such according to one example according to one aspect of the present disclosure.

In the absence of a bend in the housing 206, the strain measurement by the strain gauge 202 can be used to determine a baseline measurement. If housing 206 bends, as shown in FIG. 2B, the bendable housing 206 can contact the formation 208 at a contact point 212, causing the strain measurement by the strain gauge 202 to change. The changed strain measured by the strain gauge 202 can be used to determine the bend direction and/or bend amount in the adjustable motor assembly 200. For example, in one such embodiment, the changed strain measurement can be compared to a calibration table that correlates strain measurements to bend amounts or bend directions. In another such embodiment, the difference between the changed strain measurement and the baseline strain measurement can be compared to a calibration table to determine bend amounts or bend directions.

Figure 3A:
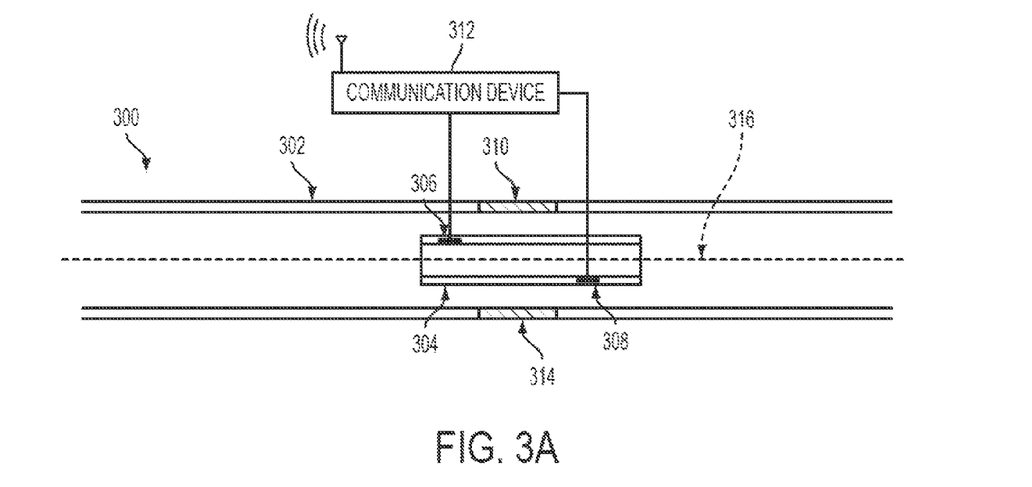
FIG. 3A is a cross-sectional side view of one embodiment of an assembly for determining bend measurements of an adjustable motor assembly using strain gauges in which there is no bend in the adjustable motor assembly according to one aspect of the present disclosure.

FIG. 3A is a cross-sectional side view of one embodiment of an assembly for determining bend measurements of an adjustable motor assembly 300 using strain gauges 306 and 308. The adjustable motor assembly 300 can include a housing 302 that can bend via an adjustable ring 310. The adjustable motor assembly 300 can include a mandrel 304 inside the housing 302. The adjustable motor assembly 300 can further include a strain gauge 306 positioned on the mandrel 304 on a first side of a bend location 314 for determining a strain. Likewise, in some embodiments, another strain gauge 308 can be positioned on the mandrel 304 on a second side of the bend location 314 for determining an additional strain. In other embodiments, the strain gauges 306, 308 can be positioned on the housing 302 on the first and second side of the bend location 314, respectively. In some such embodiments, the strain gauges 306, 308 can be equidistant from the bend location 314.

Figure 3B:
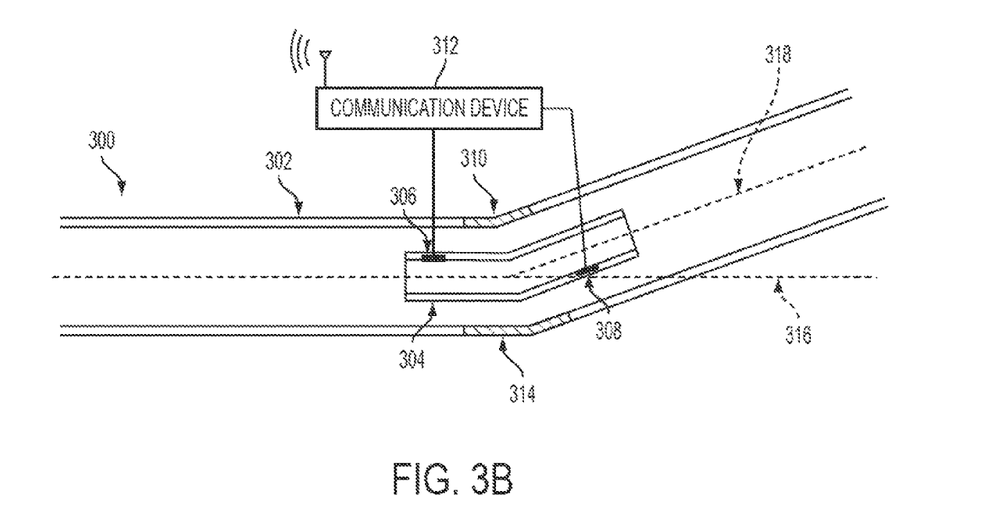
FIG. 3B is a cross-sectional side view of the embodiment in FIG. 3A in which there is a bend in the adjustable motor assembly according to one aspect of the present disclosure.

An axial load on the bottom hole assembly causes force to be exerted along a center axis 316 of the adjustable motor assembly 300 in a direction either away from or toward the motor assembly 300. Axial forces exerted along the axis 316 distribute stresses and strains across a cross-section of a body. In the absence of a bend in the adjustable motor assembly 300, the axial force along the axis 316 distributes stresses and strains in an even or substantially even manner across the cross-section of the adjustable motor assembly 300. In the presence of a bend in the adjustable motor assembly, as shown in FIG. 3B, forces in addition to the axial force along axis 316 are present, such as force along an axis 318. The additional force along the axis 318 causes tensions and compressions around the cross-section of the adjustable motor assembly 300. The tensions and compressions can change an amount of strain measured by the strain gauges 306, 308. The changes in the amount of strain measured by the strain gauges 306, 308 can be used to determine one or more of a bend direction and a bend amount of the adjustable motor assembly 200. In some such embodiments, because of the axial forces along axis 316 imparted on the adjustable motor assembly 300, the adjustable motor assembly 300 need not contact a formation to generate changes in strain to determine a bend amount or bend direction.

In some embodiments, the strain gauges 306, 308 can include a communication device 312 for communicating with a computing device, e.g. computing device 116 depicted in FIG. 1. The communication device 312 can be internal or external to the strain gauges 306, 308. In such an embodiment, the computing device 116 can determine one or both of a bend direction and a bend amount based on changes in strain measured by the strain gauges 306, 308.

In one embodiment, the computing device 116 can determine the bend amount of the second motor housing assembly member with respect to the first motor housing assembly member by obtaining a strain measurement from the strain gauge 306 and comparing the obtained strain measurement to a baseline strain measurement obtained in a calibration operation. In one such embodiment, a difference between the obtained strain measurement and the baseline strain measurement can be directly proportional to the amount of bend. In another embodiment, the computing device 116 can determine the bend amount of a motor housing assembly member by determining a first set of strain measurements at the respective strain gauges 306, 308. The computing device 116 can determine a first difference between the strain measurements of the respective strain gauges 306, 308. In some embodiments, by using a calibration table, the computing device 116 can associate the first difference between strain measurements with a first bend amount (e.g., an absence of bending in any direction for an un-bent motor assembly 122) of the second motor housing assembly member with respect to the first motor housing assembly member. After bending, the computing device 116 can further determine a second difference between the changed strain measurements of the respective strain gauges 306, 308. In some embodiments, by using a calibration table, the computing device 116 can associate the second difference between strain measurements with a second bend amount (e.g., an absence of bending in any direction for an un-bent motor assembly 122) of the second motor housing assembly member with respect to the first motor housing assembly member.

Figure 4A:
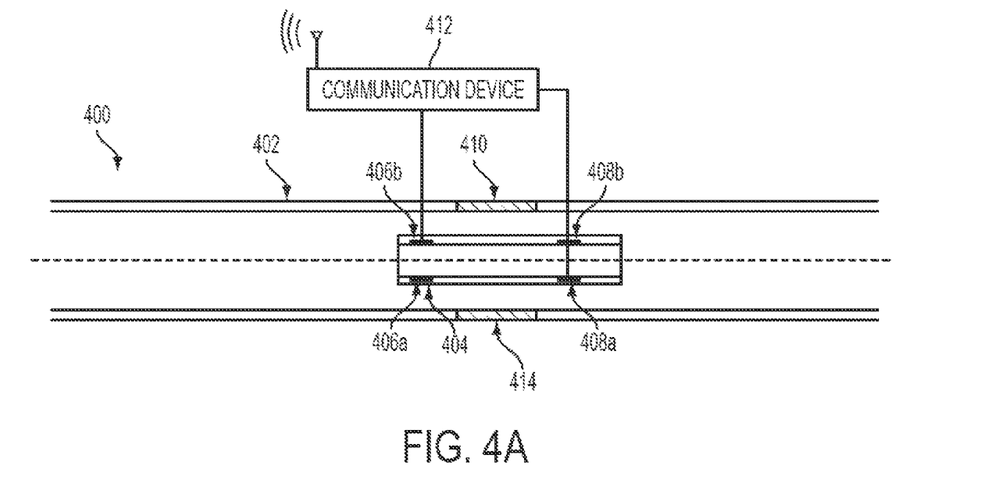
FIG. 4A is a cross-sectional side view of an embodiment in which there are multiple strain gauges positioned around the circumference of a mandrel according to one aspect of the present disclosure.

In some embodiments, computing device 116 can further determine a bend direction. In some such embodiments, multiple strain gauges can be positioned around the circumference of the mandrel. For example, FIG. 4A is a cross-sectional side view of one embodiment of an assembly for determining bend measurements of an adjustable motor assembly 400 using strain gauges 406a, 406b and 408a, 408b. The adjustable motor assembly 400 can include a housing 402 that can bend via an adjustable ring 410. The adjustable motor assembly 400 can include a mandrel 404 inside the housing 402. The adjustable motor assembly 400 can further include strain gauges 406a-b positioned on the mandrel 404 on a first side of a bend location 414 for determining a strain. Other strain gauges 408a-b can be positioned on the mandrel 404 on a second side of the bend location 414 for determining an additional strain. Multiple strain gauges can be positioned around the circumference of the housing 402. In some embodiments, multiple strain gauges 406a-b can be positioned on a first side of the bend location 414. Further, in some embodiments, multiple strain gauges 408a-b can also be positioned on a second side of the bend location 414. As the adjustable motor assembly bends, contact with the formation or axial forces can cause the strains measured by strain gauges 406a-b, 408a-b to change. These changed strain measurements can be used to determine respective bend amounts in different planes. For example, a first difference between strain measurements from 406a, 408a can identify a bend amount with respect to a first plane, and a second difference between strain measurements from 406b, 408b can identify a bend amount with respect to a second plane. In such an embodiment, computing device 116 can combine the strain measurements from each strain gauge 406a-b, 408a-b and determine a bend direction of the first motor housing assembly member relative to the second motor housing assembly member.

Figure 4B:
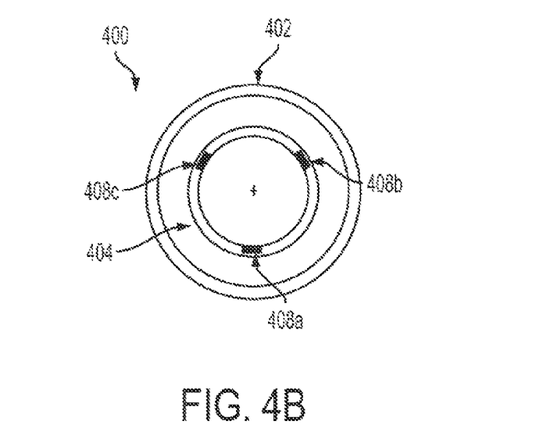
FIG. 4B is a cross-sectional end view of the embodiment in FIG. 4A in which there are multiple strain gauges positioned around the circumference of a mandrel according to one aspect of the present disclosure.

FIG. 4B is a cross-sectional end view of the embodiment in FIG. 4A in which there are multiple strain gauges 408a-c positioned around the circumference of the mandrel 404. In some embodiments, such as the embodiment shown in FIG. 4B, multiple strain gauges 408a-c are equally spaced around the circumference of the mandrel 404. In other embodiments, multiple strain gauges 408a-c may be unequally spaced around the circumference of the mandrel. Further, in some embodiments, multiple strain gauges 408a-c may be equally or unequally spaced around the circumference of the housing 402. Any number or arrangement of strain gauges may be used.

Figure 5:
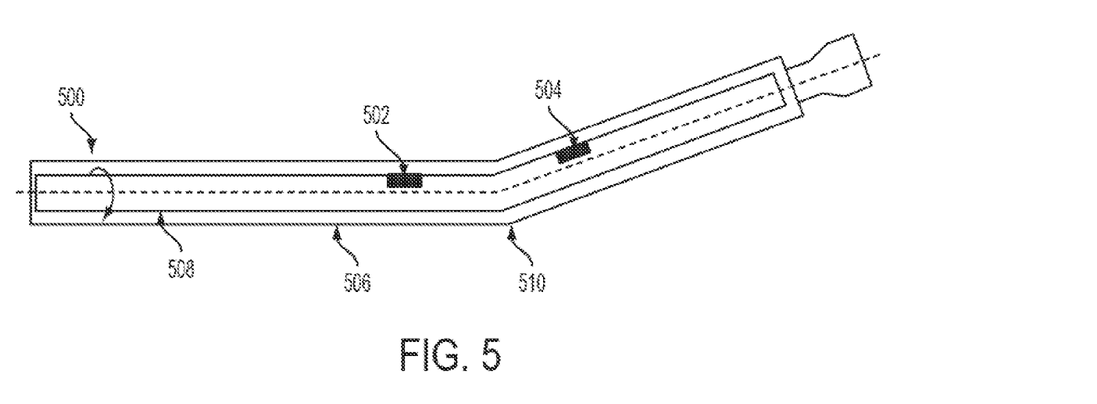
FIG. 5 is a cross-sectional side view of another embodiment of an assembly for determining bend measurements of an adjustable motor assembly using strain gauges in which the strain gauges are positioned on a rotating shaft according to one aspect of the present disclosure.

FIG. 5 is a cross-sectional side view of another embodiment of an assembly for determining bend measurements of an adjustable motor assembly using strain gauges 502, 504 in which the strain gauges 502, 504 are positioned on a rotating shaft. In such an embodiments, a strain gauge 504 can be positioned on a rotating shaft 508 inside the housing 506 for determining a strain on a first side of a bend location 510. The rotating shaft 508 can rotate around a rotational axis. Similarly, in some embodiments, an additional strain gauge 502 can be positioned on the rotating shaft 508 for determining an additional strain on a second side of the bend location 510.

As the shaft 508 rotates, the strain measurements from strain gauges 502, 504 can change. In such an embodiment, the computing device 116 can determine one or both of a bend direction and a bend amount based on changes in the strain measurements. In one such embodiment, the computing device 116 can determine a first difference between the strain measurements of the respective strain gauges 502, 504 at any given point in the rotation cycle. The computing device 116 can associate the first difference between strain measurements with a first bend amount (e.g., an absence of bending in any direction for an un-bent motor assembly 122) of the second motor housing assembly member with respect to the first motor housing assembly member. Further, at the same point in the rotation cycle, the computing device 116 can determine a second set of strain measurements at the respective strain gauges 502, 504 based on a bending of the motor assembly 500. The computing device 116 can determine a second difference between the strain measurements of the respective strain gauges 502, 504. The first and second differences can be used to determine a bend amount and/or bend direction of the second motor housing assembly member with respect to the first motor housing assembly member.

In another embodiment, computing device 116 can determine first and second net strains by calculating moving averages of strain measurements taken by the strain gauges 502, 504. The difference between the first and second net strains can be used to determine a bend amount of the adjustable motor assembly.

Figure 6:
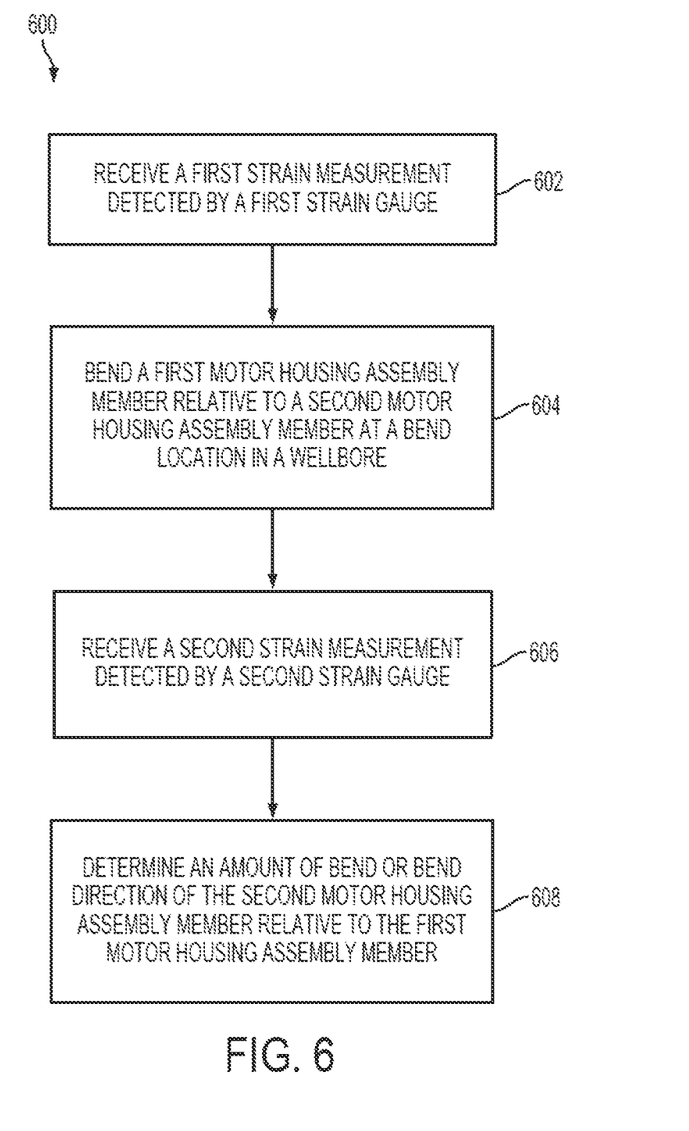
FIG. 6 is an example of a flow chart of a process for determining bend measurements of an adjustable motor assembly using strain gauges according to one embodiment.

FIG. 6 is an example of a flow chart of a process 600 for determining bend measurements of an adjustable motor assembly using strain gauges according to one embodiment.

In block 602, a first strain measurement detected by a first strain gauge is received. The first strain measurement can be associated with a motor assembly (such as, but not limited to, the motor assemblies 200, 300, 400, or 500) in which a first motor housing assembly member can bend relative to a second motor housing assembly member. The first strain measurement can be received by a computing device 116 via a communication device 312. The first strain measurement can be used as a baseline measurement against which subsequent strain measurements can be compared to determine an amount of bend or bend direction of an adjustable motor assembly. The computing device 116 can be located at any suitable location (e.g., at the surface of the wellbore, below ground, or offsite).

In block 604, a first motor housing assembly member bends relative to a second motor housing assembly member at a bend location in a wellbore 112. In one such embodiment, a drill operator can cause the first motor housing assembly member to bend relative to the second motor housing assembly member in order to navigate around a bend in the formation of the wellbore 112. In some embodiments, the first motor housing assembly can bend relative to the second motor housing assembly member automatically in response to encountering a bend in the formation of the wellbore 112. In another embodiment, the drill operator can cause the first motor housing assembly member to bend relative to the second motor housing assembly member to drill along a designated drilling trajectory. As the first motor housing assembly member bends relative to the second motor assembly housing member, the strain can change. As the strain changes, the strain measured by one or more strain gauges can change.

In block 606, a second strain measurement detected by a second strain gauge is received. The second strain measurement can be received by a computing device 116 via the communication device 312.

In block 608, the amount of bend and a bend direction of the first motor housing assembly member relative to the second motor housing assembly member is determined. In some embodiments, this determination is performed by a computing device 116. In some embodiments, the bend direction and bend amount can be determined based on a comparison of the baseline first strain measurement detected to the second strain measurement detected. The difference between the first strain measurement and the second strain measurement can be indicative of the amount of bend and bend direction of the first motor housing assembly member relative to a second motor housing assembly member.

In some embodiments, the computing device 116 can determine the amount of bend and bend direction via a communication device 312 and compare it with a designated drilling trajectory. Should the amount of bend and bend direction determined by the computing device 116 need to be altered to conform with the designated drilling trajectory, the computing device 116 can cause the amount of bend or bend direction of the second motor housing assembly member relative to the first motor housing assembly member to change.

Figure 7:
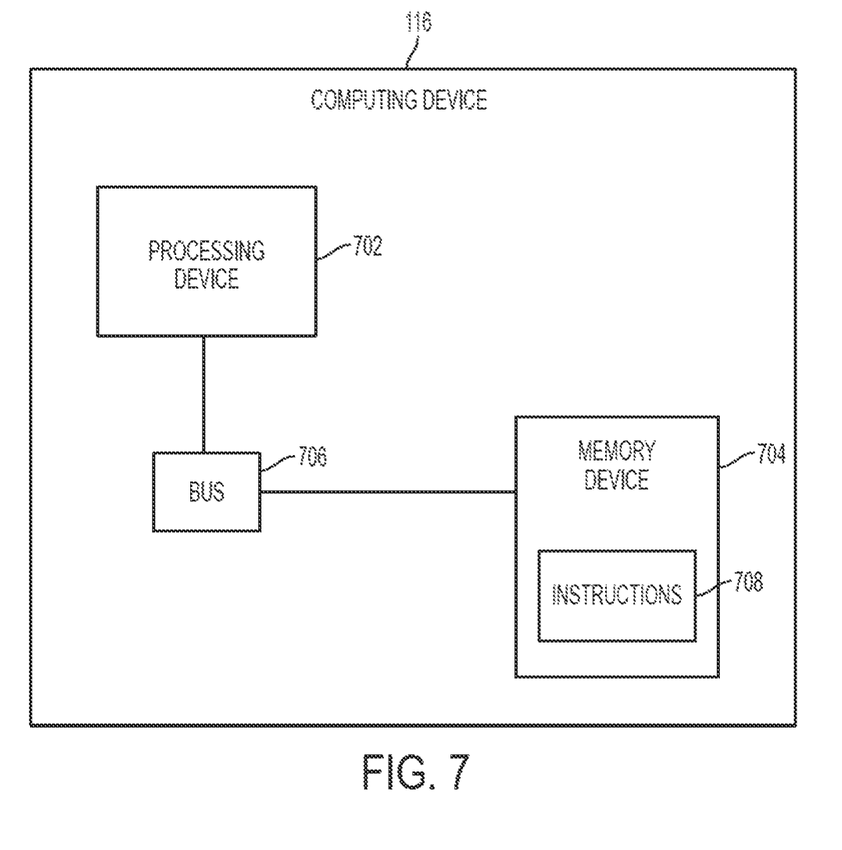
FIG. 7 is a block diagram depicting an example of a computing device for determining bend measurements of an adjustable motor assembly using strain gauges.

FIG. 7 is a block diagram depicting an example of a computing device 116 for determining bend measurements of an adjustable motor assembly using strain gauges. The computing device 116 includes a processing device 702, a memory device 704, and a bus 706.

The processing device 702 can execute one or more operations for determining bend measurements of an adjustable motor assembly using strain gauges. The processing device 702 can execute instructions 708 stored in the memory device 704 to perform the operations. The processing device 702 can include one processing device or multiple processing devices. Non-limiting examples of the processing device 702 include a Field-Programmable Gate Array ("FPGA"), an application-specific integrated circuit ("ASIC"), a microprocessor, etc.

The processing device 702 can be communicatively coupled to the memory device 704 via the bus 706. The non-volatile memory device 704 may include any type of memory device that retains stored information when powered off. Non-limiting examples of the memory device 704 include electrically erasable programmable read-only memory ("ROM"), flash memory, or any other type of non-volatile memory. In some aspects, at least some of the memory device 704 can include a medium from which the processing device 702 can read instructions. A computer-readable medium can include electronic, optical, magnetic, or other storage devices capable of providing the processing device 702 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, etc.

In some aspects, an assembly for determining bend measurements of an adjustable motor assembly using strain gauges is provided according to one or more of the following examples.

Example #1

An assembly for determining bend measurements of an adjustable motor assembly using strain gauges can include a first motor housing assembly member. The assembly can also include a second motor housing assembly member and a strain gauge. The second motor housing assembly member can be coupled to the first motor housing assembly member and bendable relative to the first motor housing assembly member at a bend location in a wellbore. The strain gauge can be positioned on a first side of the bend location to determine a strain. Based on the strain, an amount of bend of the second motor housing assembly member relative to the first motor housing assembly member can be determined.

Example #2

The assembly of Example #1 may feature a strain gauge positioned on the exterior of the second motor assembly housing member.

Example #3

The assembly of any of Examples #1-2 may feature the strain gauge being included in a multitude of strain gauges.

Example #4

The assembly of any of Examples #1-3 may feature the multitude of strain gauges equidistantly spaced around a circumference of the second motor assembly housing member.

Example #5

The assembly of any of Examples #1-4 may feature a communication device operable to communicate data from one or more strain gauges to a computing device.

Example #6

The assembly of any of Examples #1-5 may feature the strain gauge communicatively coupled to the communication device.

Example #7

The assembly of any of Examples #1-6 may feature a computing device that is operable to compare one or more measurements to a calibrated strain measurement associated with a bend amount or bend direction.

Example #8

The assembly of any of Examples #1-7 may feature an additional strain gauge positioned on the first motor housing assembly member to determine an additional strain.

Example #9

The assembly of any of Examples #1-8 may feature the additional strain gauge positioned on the exterior of the first motor housing assembly member.

Example #10

The assembly of any of Examples #1-9 may feature the strain gauge and additional strain gauge equidistantly spaced from the bend location.

Example #11

The assembly of any of Examples #1-10 may feature the additional strain gauge communicatively coupled to the communication device.

Example #12

The assembly of any of Examples #1-11 may feature the additional strain gauge being included in a multitude of strain gauges, with the multitude of strain gauges equidistantly spaced around a circumference of the first motor housing assembly member.

Example #13

The assembly of any of Examples #1-12 may feature a strain based on stress induced by a contact between the drill string and the wellbore.

Example #14

The assembly of any of Examples #1-12 may feature a strain based on an axial force induced by bending of the first motor housing assembly member with respect to the second motor assembly housing member.

Example #15

The assembly of any of Examples #1, 3, and 5-14 may feature a third motor assembly member inside the first housing member or the second housing member. The assembly may further feature the strain gauge positioned on the third motor assembly member to determine the strain.

Example #16

The assembly of Example #15 may feature the strain gauge being included in a multitude of strain gauges that are positioned on a first side of the bend location.

Example #17

The assembly of any of Examples #15-16 may feature an additional strain gauge positioned on the third motor assembly member on a second side of the bend location to determine an additional strain.

Example #18

The assembly of any of Examples #15-17 may feature the additional strain gauge being included in a plurality of additional strain gauges that are positioned on the second side of the bend location.

Example #19

A method for determining bend measurements of an adjustable motor assembly using strain gauges can include receiving, by a computing device, a first strain detected by a first strain gauge. A first motor housing assembly member can bend relative to a second motor housing assembly member at a bend location in a wellbore. A second strain measurement detected by a second strain gauge can be received by a computing device. Finally, the assembly can determine, by a computing device, an amount of bend or bend direction of the second motor housing assembly member relative to the first motor housing assembly member based on the first and second strain measurements.

Example #20

The method of Example #19 may feature associating the first strain measurement with a first bend amount. The computing device can associate the second strain measurement with a second bend amount. Further, the computing device can determine the difference between the first bend amount and the second bend amount.

Example #21

The method of any of Examples #19-20 may feature associating the first strain with a first bend direction and associating the second strain with a second bend direction. Finally, the computing device can determine the difference between the first bend direction and the second bend direction.

Example #22

The method of any of Examples #19-21 may feature determining if the bend direction and bend amount should be altered to conform with a designated drilling trajectory. Further, the method may feature causing the amount of bend or bend direction of the second motor housing assembly member relative to the first motor housing assembly member to change.

Example #23

A computing device for determining bend measurements of an adjustable motor assembly using strain gauges can include a processing device and a memory. The memory can include instructions executable by the processing device. The instructions can include receiving a first strain measurement detected by a first strain gauge. Further, the instructions can include receiving a second strain measurement detected by a second strain gauge, and determining an amount of bend or bend direction of the second motor housing assembly member relative to the first motor housing assembly member based on the first and second strain measurements.

Example #24

The computing device of Example #23 may feature instructions for associating the first strain measurement with a first bend amount and associating the second strain measurement with a second bend amount. The computing device may further feature instructions for determining the difference between the first bend amount and the second bend amount.

Example #25

The computing device of any of Examples #23-24 may feature instructions for associating the first strain measurement with a first bend direction. The computing device may further feature instructions for associating the second strain measurement with a second bend direction. Finally, the computing device may feature instructions for determining the difference between the first bend direction and the second bend direction.

Example #26

The computing device of any of Examples #23-25 may feature instructions for determining if the amount of bend or bend direction should be altered to conform with a designated drilling trajectory and causing the amount of bend or bend direction of the second motor housing assembly member relative to the first motor housing assembly member to change.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A downhole system, comprising:
 a first motor housing assembly member comprising a first strain gauge for transmitting a first strain measurement to a computing device; and
 a second motor housing assembly member coupled to the first motor housing assembly member and bendable relative to the first motor housing assembly member at a bend location, the second motor housing assembly member comprising a second strain gauge for transmitting a second strain measurement to the computing device;
 wherein the computing device is communicatively coupled to the first strain gauge and the second strain gauge to determine (i) a direction in which the second motor housing assembly member is bent relative to the first motor housing assembly member based on the first strain measurement and the second strain measurement, or (ii) an amount in which the second motor housing assembly member is bent relative to the first motor housing assembly member based on a difference between a first bend amount associated with the first strain measurement and a second bend amount associated with the second strain measurement.

2. The downhole system of claim 1, wherein the computing device is operable to determine the direction in which the second motor housing assembly member is bent relative to the first motor housing assembly member.

3. The downhole system of claim 1, wherein the second strain gauge is included in a plurality of strain gauges that are positioned on the second motor assembly housing member.

4. The downhole system of claim 3, wherein the plurality of strain gauges are equidistant around a circumference of the second motor assembly housing member.

5. The downhole system of claim 1, further comprising a communication device operable to communicate data from the first strain gauge or the second strain gauge to the computing device.

6. The downhole system of claim 5, wherein the second strain gauge is communicatively coupled to the communication device.

7. The downhole system of claim 5, wherein the computing device is operable to compare the first strain measurement or the second strain measurement to a predefined strain measurement associated with a particular bend amount or a particular bend direction.

8. The downhole system of claim 5, wherein the first strain gauge is communicatively coupled to the communication device.

9. The downhole system of claim 1, wherein the computing device is operable to determine the amount in which the second motor housing assembly member is bent relative to the first motor housing assembly member.

10. The downhole system of claim 1, wherein the first strain gauge is positioned on an exterior of the first motor housing assembly member.

11. The downhole system of claim 1, wherein the first strain gauge and the second strain gauge are equidistant from the bend location.

12. The downhole system of claim 1, wherein the first strain gauge is included in a plurality of strain gauges that are positioned on the first motor housing assembly member, and the plurality of strain gauges are equidistantly spaced around a circumference of the first motor housing assembly member.

13. The downhole system of claim 1, wherein the first strain measurement indicates a stress induced on the first motor housing assembly member or the second motor housing assembly member as a result of a contact between a drill string and a wall of a wellbore.

14. The downhole system of claim 1, wherein first strain measurement indicates an axial force induced on the first motor housing assembly member or the second motor housing assembly member as a result of the first motor housing assembly member bending with respect to the second motor assembly housing member.

15. The downhole system of claim 1, further comprising a third motor assembly member inside the first motor assembly housing member or the second motor assembly housing member, wherein a strain gauge is positioned on the third motor assembly member to determine a strain.

16. The downhole system of claim 15, wherein the strain gauge that is positioned on the third motor assembly member is the first strain gauge or the second strain gauge.

17. The downhole system of claim 15, wherein:
the first strain gauge is positioned on the third motor assembly member and on a first side of the bend location; and
the second strain gauge is positioned on the third motor assembly member and on a second side of the bend location.

18. The downhole system of claim 17, wherein the second strain gauge is included in a plurality of strain gauges that are positioned on the second side of the bend location.

19. A method comprising:
receiving, by a computing device, a first strain measurement detected by a first strain gauge;
receiving, by the computing device, a second strain measurement detected by a second strain gauge; and
determining, by the computing device and based on the first strain measurement and the second strain measurement, a direction in which a second motor housing assembly member is bent relative to a first motor housing assembly member or an amount in which the second motor housing assembly member is bent relative to the first motor housing assembly member,
wherein determining the amount in which the second motor housing assembly member is bent relative to the first motor housing assembly member comprises:
determining a first bend amount associated with the first strain measurement;
determining a second bend amount associated with the second strain measurement; and
determining a difference between the first bend amount and the second bend amount.

20. The method of claim 19, wherein the computing device determines the direction in which a second motor housing assembly member is bent relative to a first motor housing assembly member.

21. The method of claim 20, wherein the difference is a first difference, and further comprising:
associating the first strain measurement with a first bend direction;
associating the second strain measurement with a second bend direction; and
determining a second difference between the first bend direction and the second bend direction.

22. The method of claim 19, further comprising:
determining that the direction or the amount is to be altered to conform with a drilling trajectory; and
based on determining that the direction or the amount is to be altered to conform to the drilling trajectory, causing the direction or the amount to change.

23. The method of claim 19, wherein the computing device determines the amount in which the second motor housing assembly member is bent relative to the first motor housing assembly member.

24. A computing device comprising:
a processing device;
a memory device in which instructions executable by the processing device are stored for causing the processing device to:
receive a first strain measurement detected by a first strain gauge;
receive a second strain measurement detected by a second strain gauge; and
determine, based on the first strain measurement and the second strain measurement, a direction in which a second motor housing assembly member is bent relative to a first motor housing assembly member or an amount in which the second motor housing assembly member is bent relative to the first motor housing assembly member,
wherein determining the amount in which the second motor housing assembly member is bent relative to the first motor housing assembly member comprises:
determining a first bend amount associated with the first strain measurement;
determining a second bend amount associated with the second strain measurement; and
determining a difference between the first bend amount and the second bend amount.

25. The computing device of claim 24, wherein the memory device includes instructions executable by the processing device for causing the processing device to determine the direction in which a second motor housing assembly member is bent relative to a first motor housing assembly member by:
associating the first strain measurement with a first bend amount;
associating the second strain measurement with a second bend amount; and
determining the difference between the first bend amount and the second bend amount.

26. The computing device of claim 24, wherein the difference is a first difference, and wherein the memory device further comprises instructions that are executable by the processing device for causing the processing device to:
associate the first strain measurement with a first bend direction;
associate the second strain measurement with a second bend direction; and
determine a second difference between the first bend direction and the second bend direction.

27. The computing device of claim 24, wherein the memory device further comprises instructions that are executable by the processing device for causing the processing device to:
determine that the direction or the amount is to be altered to conform with a drilling trajectory; and
based on determining that the direction or the amount is to be altered to conform to the drilling trajectory, cause the direction or the amount to change.

28. The computing device of claim 24, wherein the memory device includes instructions executable by the processing device for causing the processing device to determine the amount in which the second motor housing assembly member is bent relative to the first motor housing assembly member.

* * * * *